L. JAENICHEN.
SCALE.
APPLICATION FILED DEC. 23, 1910.
994,926.
Patented June 13, 1911.
3 SHEETS—SHEET 1.
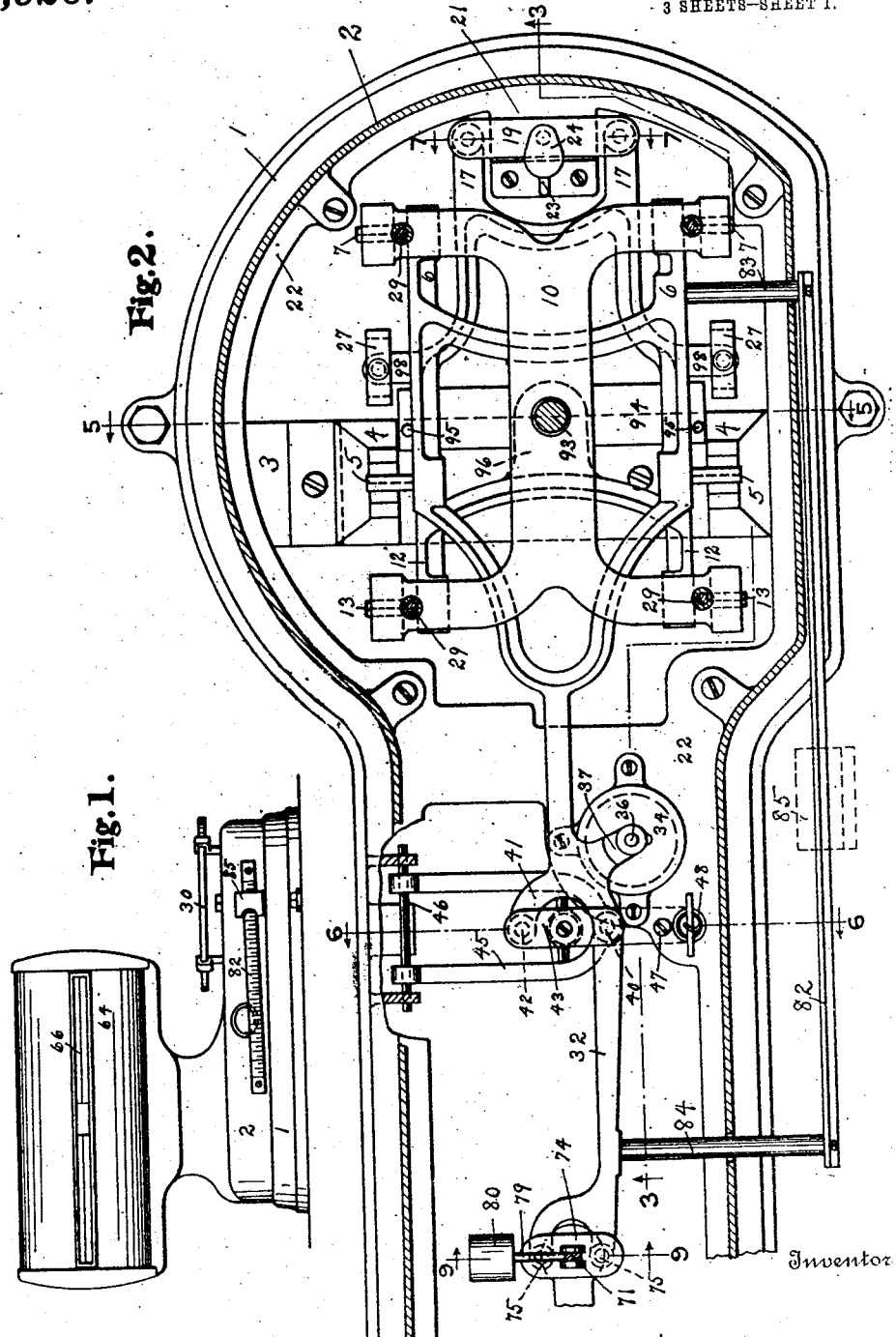

L. JAENICHEN.
SCALE.
APPLICATION FILED DEC. 23, 1910.
994,926.
Patented June 13, 1911.
3 SHEETS—SHEET 2.
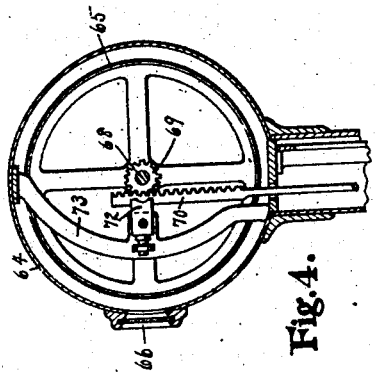
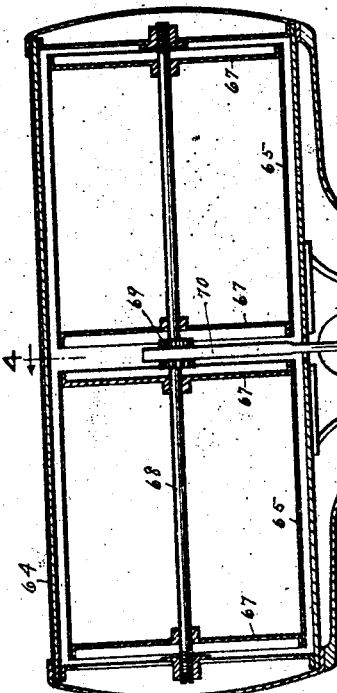
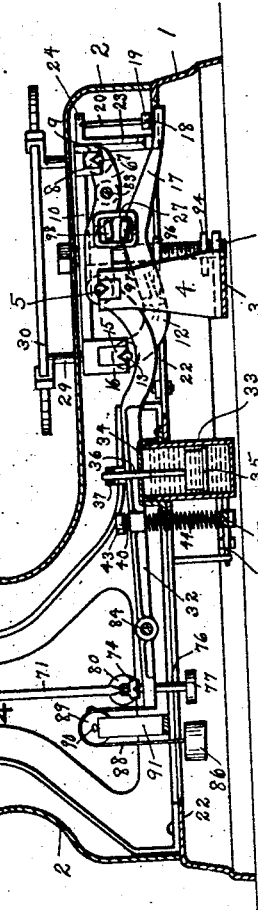
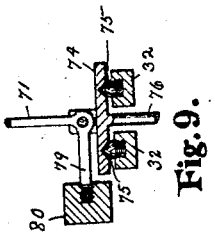
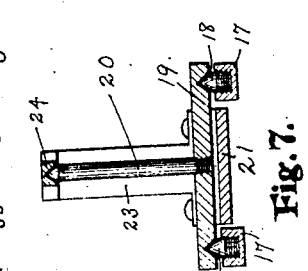
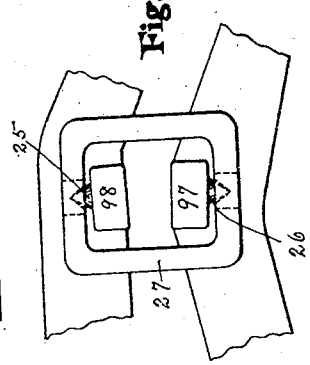
Witnesses
Albert A. Hofmann
Elizabeth M. Brown
Inventor
Louis Jaenichen.
By Edward N. Pagelsen, Attorney

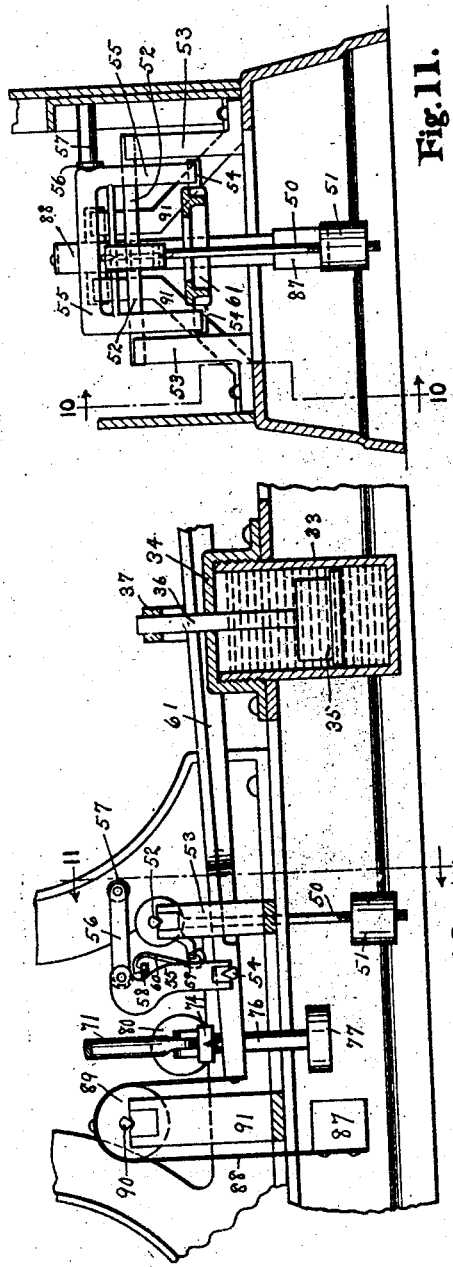
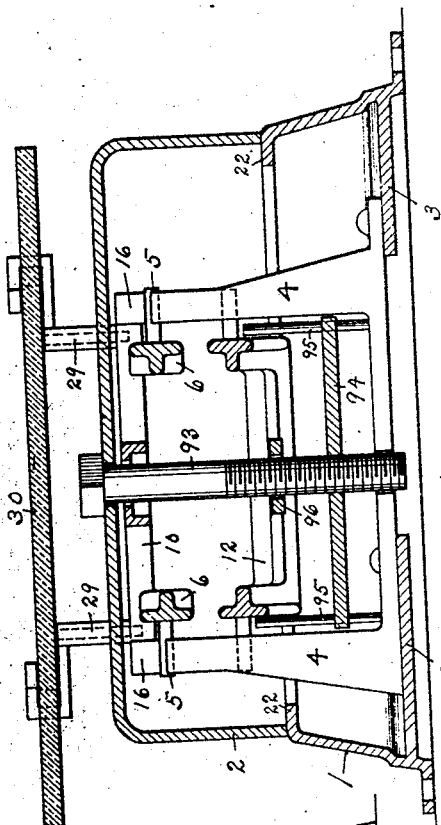
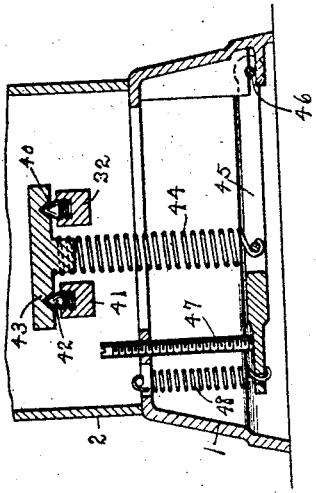

UNITED STATES PATENT OFFICE.

LOUIS JAENICHEN, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

994,926.  Specification of Letters Patent.  Patented June 13, 1911.

Application filed December 23, 1910. Serial No. 598,915.

*To all whom it may concern:*

Be it known that I, LOUIS JAENICHEN, a citizen of the United States, and a resident of Detroit, in the county of Wayne and State of Michigan, have invented a new and useful Scale, of which the following is a specification.

This invention relates to that class of scales in which the movement of the main levers is intended to be in proportion to the load, and its object is to provide a system of levers and supports which will be so adjusted and proportioned that the weight indicator will move through predetermined distances varying directly as the load, and wherein all the parts will move freely.

In the accompanying drawing, Figure 1 is a side elevation of the preferred form of scale. Fig. 2 is a plan of the lever mechanism. Fig. 3 is a cross section on the line 3—3 of Fig. 2, on a smaller scale. Fig. 4 is a cross section on the line 4—4 of Fig. 3. Fig. 5 is a cross section on the line 5—5 of Fig. 2. Fig. 6 is a cross section on the line 6—6 of Fig. 2. Figs. 7, 8 and 9 are details of lever pivots. Fig. 10 is a cross section of a modified form of the indicating end of the main lever and connections thereto, on the line 10—10 of Fig. 11. Fig. 11 is a cross section on the line 11—11 of Fig. 10.

Similar reference characters refer to like parts throughout the several views.

In the drawings, the base 1 of the scale is surmounted by a case 2 which incloses the operating mechanism, and on the base is mounted the frame which carries the indicating device. The base has two inwardly turned plates 3, (Fig. 5) which support the main pedestals 4, at the upper end of which are the bearings for the main knife-edges 5 of the main lever. At the rear end of the double short arm 6 of the main lever are the knife-edges 7 on which rest the bearing blocks 8, held between jaws 9 on the spider 10.

The secondary lever has a double front arm 12 and rear arm 17. The front arm carries the knife-edges 13 which support the bearings 15 held between the jaws 16 on the lower side of the spider 10. The rear arm 17 of the lever is also double and carries the pivots 18 which engage a cross-plate 19, from which the thrust member or post 20 extends upwardly as shown in Fig. 7. A plate 21 extends forward from the rear portion of the inwardly extending flange 22 of the base and carries a bracket 23, at the upper end of which is a bearing plate 24 which engages the pointed upper end of the post 20. The lever arm 17 can therefore swing back and forth through small arcs.

As shown in Figs. 2, 3 and 8, the main lever carries the intermediate pivots 25 and the secondary lever the pivots 26 which are in engagement with bearings at the inner faces of the top and bottom cross-bars respectively of the links 27. On the spider 10 are mounted the posts 29 which extend upwardly through proper openings in the case 2 and are properly formed to engage any desired load receiver, such as the platform 30.

The construction described operates as follows. The force of the load on the platform 30 is transmitted to the spider 10 by means of the post 29. The jaws 9 and 16 on the spider, and the bearing blocks 8 and 15 carried thereby, transmit the pressure to the knife-edges 7 and 13. The pressure on the knife-edges 7 is resisted by the upward pressure of the pedestals 4 and results in an upward force in the front arm 32 of the main lever. The downward pressure on the knife-edges 13 is counterbalanced by the similar thrust of the post 20, the united pressure being transferred to the pivots 25 on the main lever by means of the links 27. The proportions of the levers is such that the product of the distance between the pivots 13 and 26 times the distance between the pivots 25 and 7, equals the product of the distance between the pivots 26 and 18 times the distance between the pivots 5 and 25. The thrust member or post 20 by extending upwardly, renders this lever system very sensitive. It furthermore renders it possible to keep all the pivots of each lever in the same plane. As the post 20 will always act substantially parallel to the links 27, friction at the pivots is practically eliminated. The front arm 32 of the main lever engages the load resisting and load indicating devices and preferably some usual dampening mechanism, such as a dash-pot. The dash-pot 33 may be of any desired construction, secured to the top flange 22 of the base, and have a head 34, piston 35, and piston-rod 36 connected to a small arm or lug 37 on the lever arm 32.

The load-resisting device may be either a spring or a pendulum. In Figs. 2, 3 and 6, the spring-construction is shown. The lever-arm 32 is provided with a pivot 40 and with an arm 41 which carries a second pivot 42. A cross-bar 43 rests on these pivots (Fig. 6) and connects to the upper end of the spring 44. The lower end of the spring connects to the lever 45, pivoted on the rod 46, and positioned by the screw 47. The lever 45 may be held up against the screw 47 in any desired manner, as by the small spring 48.

In Figs. 10 and 11, a pendulum comprising a rod 50, weight 51, and pivots 52, is shown resting on the pedestals 53. The lever arm 61 has pivots 54 on which rests the yoke 55 which is guided by the link 56 pivoted to the post 57. The yoke has a lug 58 and the pendulum a lug 59, between which lugs extends the link 60. Any upward movement of the lever arm 61 will swing up (to the left in Fig. 10) the pendulum. The weight indicating mechanism may be of any desired type and construction. That shown is of the well-known drum type, consisting of a cylindrical case 64, having closed ends, mounted on the case 2, and provided with a glazed slot 66 through which the characters on the paper cylinders 65 may be seen. These cylinders are mounted on the spiders 67, secured to the shaft 68, revolubly mounted in the case 64, on which shaft is also secured the pinion 69 which meshes with the rack 70 on the bar 71. A guide 72 may be carried by a bracket 73, the ends of which may be secured to the case 64, which guide may hold the rack 70 in engagement with the pinion 69. The lower end of the bar 71 is pivoted to a plate 74 (Fig. 9) which rests on the pivots 75 carried by the front arm 32 of the main lever. To hold this plate in position, a rod 76 may extend down and carry the small weight 77. To hold the rack 70 against the pinion 69 when the guide 72 is omitted, a small arm 79 may be formed to extend at an angle from the lower end of the bar 71, on which arm is secured a small weight 80. A tare-beam 82 may be connected to the main lever by means of the post 83 connecting to the rear arm 6, and the post 84 connecting to the front arm 32, both posts extending through proper openings in the case 2. A proper tare-poise 85 is slidable on the beam.

In scales of this type, a heavy weight is usually secured to the rear-arm 6 of the main lever to counterbalance the long front arm of the lever and the mechanism connected thereto. While the present construction is such that the weight of the arms 32 and 61 and the parts connected thereto will usually be balanced by the parts on the other side of the pivots 5, still, if necessary, a counter-balancing device may be required, which may consist of a weight 86 or 87 at one end of a flexible connector, such as the band 88, which passes over a wheel 89 and is connected to the end of the front arm of the main lever. The wheel 89 may be provided with knife-edge pivots 90 resting on the pedestals 91.

In shipping scales, the pivots are often injured, especially if very hard, by the grinding of the bearings. This is especially true of the main bearings which are often of agate. To avoid this, means are provided for separating the knife-edges and their bearings. A bolt 93 may extend down from the case 2 and be screw-threaded in a cross-bar 94, which may be guided on the pins 95 carried by the pedestals 4. By turning the bolt 93 the cross-bar will be carried up until it engages the plate 96 projecting from the secondary lever, raising the same so its pivots 26 disengage the link 27. Further elevating the secondary lever causes its projecting lugs 97 to engage similar lugs 98 on the main lever. The spider 10 will be pressed against the top of the case 2, and the knife-edges 5 lifted off the pedestals 4. The levers will be held immovable so that injury to the pivots becomes impossible.

Having now explained this construction what I claim as my invention and desire to secure by Letters Patent is:—

1. In a scale, the combination of a base, pedestals thereon, a main lever of the first order pivoted on the pedestals, a secondary lever having pivots at its front and rear ends and intermediate its ends, said main lever having pivots at its rear end and intermediate pivots between its rear end and the pedestals, a load receiver connected to the pivots at the front end of the secondary lever and at the rear end of the main lever, links hanging on the intermediate pivots of the main lever and supporting the intermediate pivots of the secondary lever, a bracket projecting upward from the base at the rear ends of the levers, a pivoted thrust-member extending upward from the rear end of the secondary lever to said bracket, and weight indicating means connected to the front end of the main lever.

2. In a scale, the combination of a main lever of the first order, a fulcrum therefor, a secondary lever of the second order, a load receiver connected to the rear end of the main lever and the front end of the secondary lever, a bracket extending above the rear end of the secondary lever, a thrust member extending downwardly therefrom and forming the fulcrum of the secondary lever, links connecting said levers, and a weight indicating device connected to the main lever.

3. In a scale, the combination of a main lever of the first order, a fulcrum therefor, a secondary lever of the second order, a load receiver connected to the front end of the secondary lever and the rear end of the main lever, links connecting the main and secondary levers, a post pivotally connected to the rear end of the secondary lever and extending upward from the same and constituting a fulcrum for said lever, a bearing for the upper end of said fulcrum, and a load resisting device connected to the front end of the main lever.

4. In a scale, the combination of a main lever of the first order, a fulcrum therefor, a secondary lever, a load receiver connected to the rear end of the main lever and to the front end of the secondary lever, links connecting said levers, a fulcrum for the rear end of the said secondary lever comprising a post having its lower end pivotally engaging the lever, a fixed plate forming a bearing for the upper end of the post, and a load resisting device connected to said main lever.

5. In a scale, the combination of a main lever of the first order, a fulcrum therefor, a secondary lever, a load receiver connected to the rear end of the main lever and to the front end of the secondary lever, links connecting said levers, a fulcrum for the rear end of the said secondary lever comprising a post having its lower end pivotally engaging the lever, a fixed plate forming a bearing for the upper end of the post, and a load resisting device connected to said main lever, all the pivots of each lever lying in the same plane.

6. In a scale, the combination of a main lever of the first order, a fulcrum therefor, a secondary lever, a load receiver connected to the rear end of the main lever and to the front end of the secondary lever, links connecting said levers, a fulcrum for the rear end of the said secondary lever comprising a post having its lower end pivotally engaging the lever, a fixed plate forming a bearing for the upper end of the post, a load resisting device connected to said main lever, and means to lift the levers from their supporting devices.

7. In a scale, the combination of a main lever pivoted intermediate its ends, a secondary lever fulcrumed at its rear end, links connecting said levers, a base, a pedestal mounted thereon to support the main lever, a bracket mounted on the base and extending above the rear end of the secondary lever, a thrust member pivotally mounted between the bracket and secondary lever, a load receiver connecting to the front end of the secondary lever and the rear end of the secondary lever, and a weight indicating device connected to the main lever.

8. In a scale, the combination of a main lever pivoted intermediate its ends, a secondary lever fulcrumed at its rear end, links connecting said levers, a load receiver connecting to said levers, a weight indicating mechanism connected to the main lever, a wheel, a bearing for the same, a counterweight, and a flexible connection between the end of the main lever and the counterweight and passing over said wheel.

9. In a scale, the combination of a main lever pivoted intermediate its ends, a secondary lever fulcrumed at its rear end, links connecting said levers, a load receiver connected to said levers, load resisting means connected to the main lever, a weight indicating mechanism connected to the main lever, a weight and means for connecting the same to the main lever to counteract the weight of the front end of the same and of the weight indicating mechanism.

10. In a scale, the combination of a base, pedestals thereon, a main lever pivoted on said pedestals intermediate its ends, a secondary lever having upwardly extending conical pivots at its rear ends, a plate mounted on said pivots and having depressions to receive the same, a post extending upward from said plate and having a conical upper end, a bracket projecting upwardly from said base and having a bearing plate at its upper end provided with a depression to receive the end of the post, links connecting the levers, a load reciver connected to said levers, and a weight indicator connected to said main lever.

11. In a scale, the combination of a base, a main lever supported by said base intermediate its ends, a secondary lever, a link connecting the secondary lever intermediate its ends to the main lever, a load receiver, connected to one end of each of said levers, a vertical rod pivoted at its upper end to said base and resting on one end of the secondary lever, and a load resisting device connected to the main lever.

In testimony whereof I have hereunto set my hand in the presence of two subscribing witnesses.

LOUIS JAENICHEN.

Witnesses:
EDWARD N. PAGELSEN,
ELIZABETH M. BROWN.